United States Patent

Marchand et al.

(10) Patent No.: US 10,687,200 B2
(45) Date of Patent: Jun. 16, 2020

(54) METHOD FOR AUTOMATIC CONNECTION OF A MASTER DEVICE TO A SLAVE DEVICE

(71) Applicant: ORANGE, Paris (FR)

(72) Inventors: Herve Marchand, Vern sur Seiche (FR); Fabrice Fontaine, Geveze (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/305,301

(22) PCT Filed: May 12, 2017

(86) PCT No.: PCT/FR2017/051155
§ 371 (c)(1),
(2) Date: Nov. 28, 2018

(87) PCT Pub. No.: WO2017/198934
PCT Pub. Date: Nov. 23, 2017

(65) Prior Publication Data
US 2019/0342743 A1 Nov. 7, 2019

(30) Foreign Application Priority Data
May 17, 2016 (FR) ...................................... 16 54380

(51) Int. Cl.
*H04W 8/00* (2009.01)
*H04W 76/19* (2018.01)
*H04W 4/80* (2018.01)
*H04W 76/00* (2018.01)

(52) U.S. Cl.
CPC ............. *H04W 8/005* (2013.01); *H04W 4/80* (2018.02); *H04W 76/19* (2018.02)

(58) Field of Classification Search
CPC ........ H04W 8/005; H04W 76/19; H04W 4/80
USPC ................................................ 455/41.2–41.3
See application file for complete search history.

(56) References Cited

U.S. PATENT DOCUMENTS

| 2011/0021142 A1* | 1/2011 | Desai | .................... H04W 8/005 |
| | | | 455/41.2 |
| 2014/0057567 A1* | 2/2014 | Desai | ...................... H04L 63/02 |
| | | | 455/41.2 |
| 2015/0296020 A1 | 10/2015 | Granqvist et al. | |

FOREIGN PATENT DOCUMENTS

EP 2634999 A1 9/2013

OTHER PUBLICATIONS

International Search Report dated Jul. 27, 2017, for corresponding International Application No. PCT/FR2017/051155, filed May 12, 2017.
English translation of the International Written Opinion dated Sep. 6, 2017, for corresponding International Application No. PCT/FR2017/051155, filed May 12, 2017.

\* cited by examiner

*Primary Examiner* — Lee Nguyen
(74) *Attorney, Agent, or Firm* — David D. Brush; Westman, Champlin & Koehler, P.A.

(57) ABSTRACT

A method for connecting a master device with a slave device chosen from among several slave devices. The method includes: receiving advertising messages arising from several slave devices, the messages including respective selection data; comparing the selection data received; and connecting with at least one slave device as a function of a result of the comparing.

9 Claims, 2 Drawing Sheets

METHOD FOR AUTOMATIC CONNECTION OF A MASTER DEVICE TO A SLAVE DEVICE

CROSS-REFERENCE TO RELATED APPLICATIONS

This Application is a Section 371 National Stage Application of International Application No. PCT/FR2017/051155, filed May 12, 2017, which is incorporated by reference in its entirety and published as WO 2017/198934 A1 on Nov. 23, 2017, not in English.

TECHNICAL FIELD

The invention pertains to the general field of telecommunications.

The invention pertains more particularly to a method for connecting a master device with a slave device, the slave device being chosen from a list of slave devices which are able to communicate with the master device.

The invention can be used in the context of a Bluetooth communication network; however, the invention is not limited to this type of network but extends to any computing system which includes a master device and slave devices; in which system the master device is earmarked to communicate with all or some of the slave devices, and in particular to manage the connection with the slave devices.

PRIOR ART

Today, most mobile communication devices, such as smartphones, are endowed with wireless communication means in particular of the Bluetooth type. By virtue of this type of communication means, mobile devices can communicate with other peripheral devices and offload, at least in part, to these other devices a given task such as for example sound rendering of a content.

Recall that the Bluetooth standard is based on a master/slave mode of operation. In this context, the smartphone plays the role of the master device and the rendering devices play the role of slave devices.

Hence, in order to limit the energy consumption of the slave devices, a low-consumption wireless network has been created for communication between the master device and the slave devices. This entails for example a BLE, for "Bluetooth Low Energy", technology radio access network.

Recall that the protocol implemented in a BLE access network operates in 2 phases:
  an advertising phase where a BLE device of "peripheral" type, for example a connected object, regularly advertises its presence on the BLE access network by way of a frame "LE Advertising Report" which comprises in particular its BLE MAC address, its name and a received radio signal power level RSSI (for "Received Signal Strength Indication");
  a GATT (for "Generic Attribute Profile") connection phase where a BLE device of "central" type connects to the peripheral device so as to collect more detailed information such as the manufacturer's name, the battery level, etc.

Recall also that the BLE access technology is defined by a Bluetooth standardization group SIG in the form of a set of documents, named "Bluetooth Core Specification 4.1".

Following the advertising phase, the slave devices are detected by the "central" or master BLE device. Following detection, a user can select a slave device. To this end, the user views the slave devices for example via a screen present on the master device; thereafter he manually selects the one that he wishes to use by selecting, at the level of the master device, the name of the slave device desired from a list of slave devices; the selection can be made in various ways for example via a touchscreen present on the master device.

A problem, during selection, is that it is almost impossible, in the list proposed, to associate a slave device name with a slave device of the list envisaged hereinabove. Indeed, the name of a slave device is generally burned into a nonvolatile memory of the device in the factory; this name is generally not very explicit and can be the same for two distinct apparatuses. Moreover, the name is generally not modifiable. Consequently, in actual fact, at least at the first use, the user selects one of the slave devices at random, hoping that this is the desired slave device. In the negative, he reattempts the operation until the right slave device is selected. This selection operation can become unbearable for a user.

The invention seeks to improve the situation.

In this regard, according to a first functional aspect, the subject of the invention is a method for connecting a device, said master device, with a slave device chosen from among several slave devices, the method comprising:
  a. a step of receiving advertising messages arising from several slave devices, the messages including respective data, said selection data;
  b. a step of comparing the selection data received;
  c. a step of connecting with at least one slave device as a function of the result of the comparing step.

According to the invention, the master device selects a slave device as a function of the data received from the slave devices. It will be seen hereinafter, in relation to a second functional aspect of the invention, that a selection of a slave device brings about an updating of a datum, said selection datum, on the slave device. This updated selection datum will be received thereafter by the master device; the other selection data not updated originating from the other slave devices are also received by the master device; The master device thereafter compares the selection data received, identifies the updated datum, and connects to the associated slave device.

The master device will therefore connect to the right slave device at the first connection attempt, doing so without a user needing to select a slave device name at the level of the master device, as in the prior art. This results in a considerable time saving for the user.

According to a particular mode of implementation of the invention, the selection data are temporal data provided by respective temporal counters able to reckon respective durations of use of the slave devices, the temporal data being able to be reinitialized; in this mode, the comparing step pertains to these temporal data. The effect of the updating of a temporal datum is to make the value of this temporal datum distinctive with respect to the others.

According to a first variant of this mode of implementation, if the connecting step relates to a single slave device, the connection is performed with the slave device whose received temporal datum is the smallest. In this configuration, the temporal datum is a duration of use. The effect of the updating is to set to zero (0 min) the temporal datum associated with the selected device. This results, for the selected slave device, in a smaller temporal datum value than the others; this distinctive value allows the master device to choose the slave device associated with this value.

According to a second variant of this mode of implementation, if the connecting step relates to several slave devices, the connection is performed with the slave devices whose temporal data are included in a given temporal range (for example [0 min, 1 min]). In this configuration, several slave devices may be chosen by the master device. The interval is chosen in such a way that it is very improbable that a non-updated temporal datum lies in this interval and that on the contrary an updated temporal datum lies in this interval. For example, 1 minute (1 min) may be sufficient to select three slave devices. The interval may therefore be [0 min, 1 min]. In this way, if n slave devices are selected, the master device will choose the available slave devices having a selection datum value included in the interval [0 min, 1 min].

According to a third variant of this mode of implementation, if the connecting step relates to several slave devices, and if a number of connections is previously defined; the connection is performed in this case with a number of slave devices equal to the defined number and having the smallest temporal data. This variant avoids using a temporal range, for example [0 min, 1 min], such as described in the second variant. The number of slave devices to be chosen with a view to a connection is known at the level of the master device. In this case, if the number is N, the master device chooses the N smallest durations.

According to a fourth variant of this mode of implementation, a reinitialization brings about a setting to zero of the temporal datum; in this configuration, the value of the temporal datum resulting from the reinitialization is held at the same value for a predefined duration; for example if following reinitialization the value is 0 min, this value is held at 0 min over a predefined duration. This fourth variant is beneficial since it avoids at one and the same time the use of a temporal range such as described in the second variant hereinabove and the definition of a number of slave devices as in the third variant. In this fourth mode, as has been seen, the data reinitialized to zero minutes remain at zero minutes over a given temporal range; this range is chosen judiciously so as to correspond approximately to the time required to carry out the selection of the slave devices. Thus, if three slave devices are selected, the counters are reinitialized to zero; the new value of the temporal datum (0 min) is held at this value for example 0.15 minutes; the master device then receives three temporal data with a zero value and can choose the slave devices in question with a view to an automatic connection with these slave devices.

According to a second functional aspect, the invention deals with a method for connecting a device, said slave device, able to communicate with another device, said master device, comprising:
 a. a step of selecting the slave device, followed by an updating of a datum;
 b. a step of transmitting the updated datum to the master device; followed by
 c. a step of connecting with the master device.

According to a particular mode of implementation of the invention, the datum is a temporal datum provided by a temporal counter able to reckon a duration of use of the slave device, and in which the updating corresponds to a reinitialization of the temporal datum.

According to a first hardware aspect, the invention pertains to a device, said master device, able to communicate with another device, said slave device, chosen from among several slave devices, comprising:
 a. a reception module designed to receive advertising messages arising from several slave devices, the messages including respective data, said selection data;
 b. a comparison module designed to compare the selection data received;
 c. a connection module designed to connect the master device to at least one slave device as a function of the result of the comparing step.

According to another hardware aspect, the invention pertains to a device, said slave device, able to communicate with another device, said master device, comprising:
 a. a selection module designed to select the slave device, and an updating module able to update a datum, said selection datum, following selection;
 b. a transmission module designed to transmit the updated datum to the master device;
 c. a connection module designed to connect the slave device with the master device following transmission.

According to another hardware aspect, the invention pertains to a computer program able to be implemented on a master device such as defined hereinabove, the program comprising code instructions which, when it is executed by a processor, carries out the method steps defined hereinabove in relation to the master device.

According to another hardware aspect, the invention pertains to a computer program able to be implemented on a slave device such as defined hereinabove, the program comprising code instructions which, when it is executed by a processor, carries out the method steps defined hereinabove in relation to the slave device.

According to another hardware aspect, the invention pertains to a data medium on which a program such as defined hereinabove in relation to the master device has been stored.

According to another hardware aspect, the invention pertains to a data medium on which a program such as defined hereinabove in relation to the slave device has been stored.

The invention will be better understood on reading the description which follows, given by way of example and with reference to the appended drawings in which.

DETAILED DESCRIPTION OF AN EXEMPLARY EMBODIMENT ILLUSTRATING THE INVENTION

Figure 1:
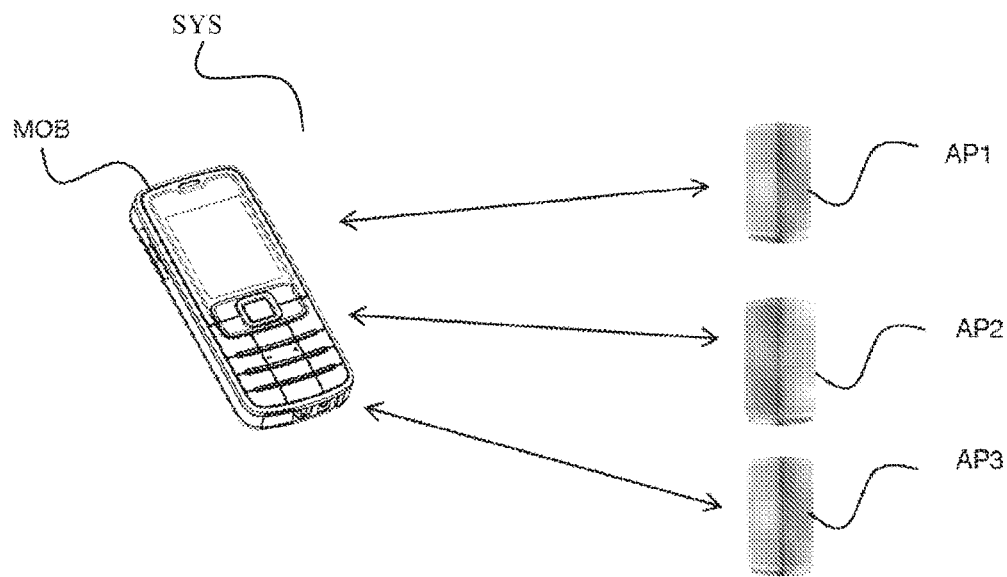
FIG. 1 represents a computing system on which an exemplary embodiment of the invention is illustrated.

FIG. 1 represents a system SYS comprising a master device MOB and slave devices namely in our example Bluetooth access points AP1-AP3. The master device is illustrated by means of a smartphone; the access points are Bluetooth enclosures.

We specify that here a master device is a device which requests a communication with a slave device. The aim of the communication may be the use of a slave device with a view to a use of the slave device with a specific aim such as sound rendering, rendering of a multimedia content, etc. The aim of the communication may also be to retrieve data on a slave device; for example if the slave device is a connected object whose function is to measure an ambient temperature, the master device may request this device to obtain a measured temperature.

Figure 2:
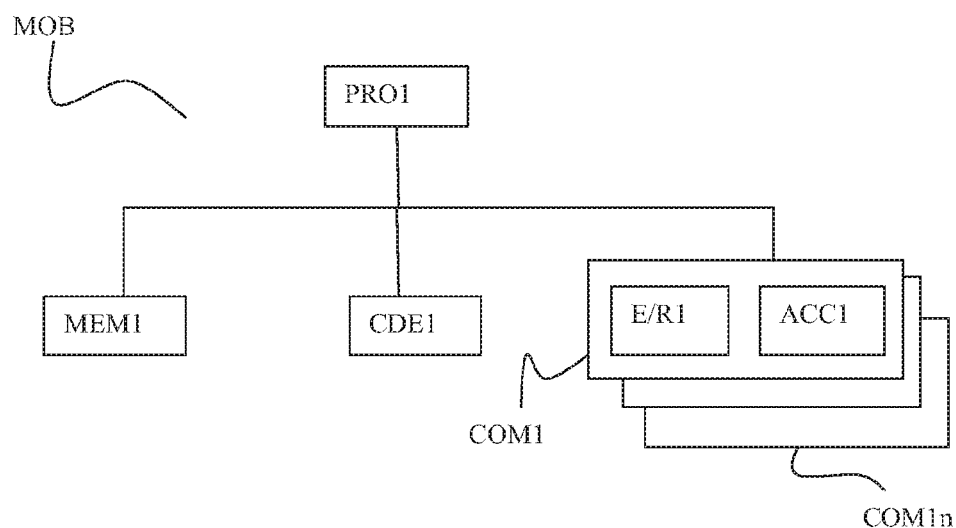
FIG. 2 represents a master device according to a particular embodiment.
Figure 3:
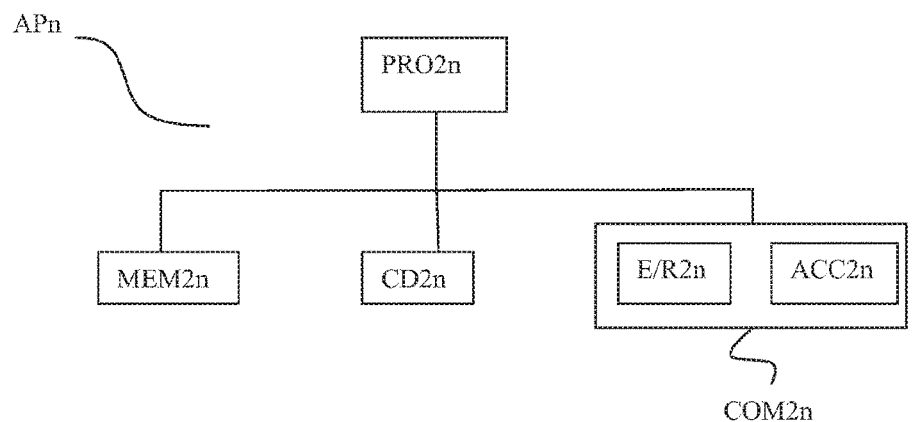
FIG. 3 represents a slave device according to a particular embodiment.

In a manner known per se, with reference to FIG. 2, the smartphone MOB has the hardware architecture of a computer. It comprises at least one processor PRO1, at least one read-only memory MEM1, at least one random-access memory (not represented), at least one communication module COM11 for communicating with the enclosures. This communication module comprises a send/receive sub-module E/R1 for sending/receiving data; and an access sub-module ACC1 for accessing the network, Bluetooth in our example.

The smartphone MOB comprises a control module CDE1 designed to dispatch commands to one or more slave devices.

The smartphone can also comprise other communication modules COMn for communication with other networks such as a cellular network of the 4G/5G type, a WiFi network, etc. However, these other communication means will not be described further since they are optional and of no interest in the disclosure of the invention.

In the read-only memory MEM1 is recorded a computer program in accordance with the invention, this program comprising instructions for executing, at least in part, the steps of the method described with reference to FIG. 4.

The communication means COM11 are able to send and to receive radiofrequency signals. For example, the communication means are able to communicate by means of the Bluetooth protocol and more specifically of the low-consumption Bluetooth BLE protocol.

Recall here that the invention is not limited to Bluetooth communication means but extends to other means such as WiFi, cellular communication means of 3G type, etc.

The enclosures also have a hardware architecture of a computer. Just as for the smartphone, the enclosures APn include at least one processor PR02n, at least one read-only memory MEM2n, at least one random-access memory (not represented), at least one communication module COM2n for communicating with the smartphone. This communication module COM2n comprises a send/receive sub-module for sending/receiving data; and an access sub-module for accessing the network, Bluetooth in our example.

In the read-only memory MEM2n is recorded a computer program in accordance with the invention, this program comprising instructions for executing, at least in part, the steps of the method described with reference to FIG. 4.

In the exemplary embodiment described hereinbelow, the assumption is made that the slave devices are powered up, ready to be used.

Recall that an exchange according to the BLE protocol is composed of 2 phases:
  the advertising phase (advertising) LE
  the connection phase (connecting) GATT As will be seen hereinbelow, these two phases will execute for each enclosure.

Figure 4:
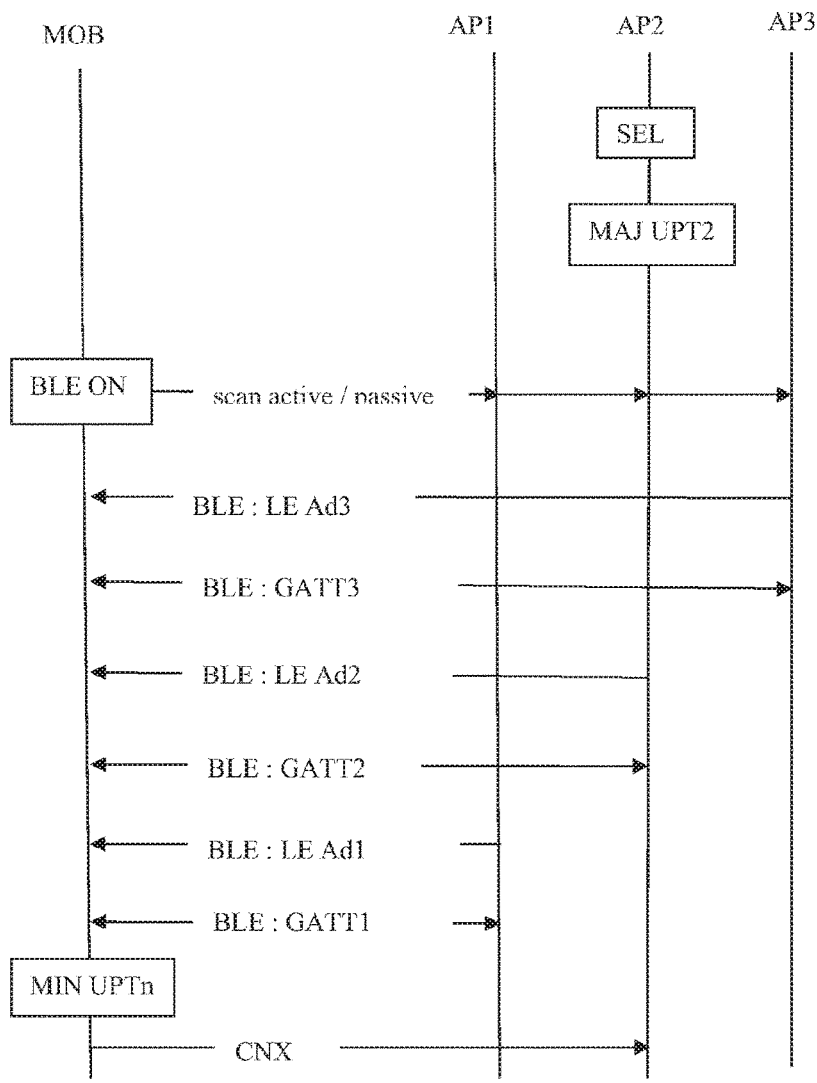
FIG. 4 illustrates steps of a method for connecting a master device with a slave device according to a particular embodiment.

The steps of an embodiment are illustrated in FIG. 4.

During a first step, the user selects SEL the second enclosure AP2 by reinitializing a datum (or parameter) said selection datum (MAJ OPT2). It is understood here that the other selection data UPT1 and UPT3 relating to the first and third enclosures AP1 and AP3, respectively, are not updated.

The reinitialization can be carried out in various ways, for example by pressing a button on the smartphone. The button can be a physical key of a physical keypad, or of a virtual keypad displayed on a graphical interface. Pressing the button causes the dispatching of a parameter reinitialization command.

Selection is very obviously not limited to this example, other modes of selection being able to be implemented; by way of example selection can be performed contactlessly; it can also be performed via a communication network. Reinitialization can also be carried out by voice.

Selection is followed by an updating MAJ of the selection datum UPT2 on the selected slave device AP2. This updating will be useful subsequently for the smartphone since the smartphone will carry out a comparison of the values received from the enclosures AP1-AP3, respectively, and will choose the enclosure whose parameter UPT2 has been updated.

In our example, this selection datum is a datum representative of a temporal duration UPTn (n=1, 2, 3), representative of a duration of use. This duration of use UPTn (n=1, 2, 3) is obtained by way of a temporal counter present on the slave devices. Pressing the button described hereinabove reinitializes the counter to zero minutes.

We will see hereinafter that other examples of implementation are possible when updating the parameter, the aim being to make this updated value distinctive with respect to the other values of the other enclosures. For example, the selection can fix the value of the selection datum at a value such that it is very probable that it is greater than the values of the parameters of the other enclosures; The resulting value, said distinctive value, is then distinguished from the other values received from the other slave devices, thus making it possible to select the enclosure concerned. According to a variant, this value is again updated following the use of the slave device to take a "non-distinctive" value; for example once the rendering of the content on the enclosure has terminated. Indeed, without a new update, if another second enclosure is selected subsequently, this would bring about the updating of the selection datum for this second enclosure to a high value, the smartphone would then receive two distinctive values, one for the first enclosure and the other for the second, which would not allow an automatic connection with a single enclosure.

Taking the example of the three enclosures AP1-AP3; by considering that the temporal data UPT1-UPT3 have respective values of 5 min, 25 min, 300 min, before the button is pressed; that the user carries out the selection by pressing the button present on the second enclosure AP2; the value of the temporal datum associated with the second enclosure becomes zero; and the temporal data then have values 15 min, 0 min, 300 min respectively.

Recall that "min" is the symbol for the temporal minute.

Thereafter, during a second step (BLE ON), in our example, the Bluetooth module is activated on the smartphone MOB.

Note that the direction of execution of the first two steps is immaterial. The Bluetooth module of the smartphone can be activated before the updating of the parameter.

Following activation, the smartphone MOB detects the slave devices AP1-AP3 with which a communication is possible. In the context of Bluetooth, detection is performed by carrying out a listening to frequencies. This listening to frequencies is generally known by the term "scan" and makes it possible to detect the presence of peripheral devices, here the enclosures.

During the listening, the smartphone receives advertising messages according to the first phase described hereinabove; these messages originate from the various slave devices APn (n=1 to 3). In our example, the advertising messages have the following form, in accordance with the BLE protocol:
  LE Advertising report (Name n, BLE MAC Address n, RSSI n)
  in which
  n=1, 2, 3 designating the enclosure concerned.
  "Name n" is the name of the enclosure APn;

"BLE MAC Address n" is the address to be used to communicate with the device APn concerned;

"RSSIn" (initials of Received Signal Strength Indication) is a datum representative of a power of signal received by the enclosure making it possible to estimate a distance between the smartphone MOB and the enclosure concerned APn.

Following the reception of this message, the chosen smartphone MOB an enclosure from among the enclosures AP1-AP3. In our example, in the context of Bluetooth, this choice is made during the second phase described hereinabove, namely the GATT connection phase. This connection phase is performed for each enclosure AP1-AP2; the resulting phases are referenced GATT1-GATT3 in FIG. 4, respectively.

It is recalled here that the GATT profile is organized hierarchically into sections, called services, which group together data called characteristics. A characteristic may correspond for example to the battery level, to the humidity factor, to the brightness factor, to the number of paces taken by a user, etc. A characteristic is identified by a unique universal identifier UUID (for "Universally Unique Identifier"). Such a request RequestBLEProfile is for example a message of the SOAP (for "Simple Object Access Protocol") protocol layer in a UPnP network. The SOAP protocol makes it possible in a UPnP network to invoke actions.

A BLE profile request can be written in the following manner:

```
POST/controlURL URL HTTP/1.1
HOST: 192.168.1.10:52000
CONTENT-LENGTH: bytes in body
CONTENT-TYPE: text/xml; charset="utf-8"
SOAPACTION: "urn:schemas-upnp-
org:service:blediscovery:1#RequestBLEProfile"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:RequestBLEProfile xmlns:u="urn:schemas-upnp-
org:service:blediscovery:1">
    <CompleteLocalName>Speaker</CompleteLocalName>
    <MACAddress>F8:C7:2D:CB:0A:22</MACAddress>
    <MACAddressType>RANDOM</MACAddressType>
</u:RequestBLEProfile>
</s:Body>
</s:Envelope>
```

With:

"F8:C7:2D:CB:0A:22" which corresponds to the MAC address of the enclosure (called "speaker" in the above message)

"RANDOM" which corresponds to the type of address.

During this phase, with reference to FIG. 4, the enclosures expose values such as the battery level, the current time. With reference to the BLE protocol, the battery level is a GATT characteristic of the type "org.bluetooth.characteristic.battery_level" identified in a unique manner by a number ("AssignedNumber") namely 0x2A19; and the current time is a GATT characteristic of the type "org.bluetooth.characteristic.current_time" identified in a unique manner by a number namely 0x2A2B. Each characteristic is encapsulated in a "service". Thus the characteristic related to the current time is written "org.bluetooth.characteristic.current_time" and forms part of the service which may be written "org.bluetooth.service.current_time". The latter service can be identified in a unique manner by the number 0x1805. Also, the characteristic "org.bluetooth.characteristic.battery_level" forms part of the service "org.bluetooth.service.battery_service" identified in a unique manner by the number 0x180F.

Recall here that with reference to the BLE protocol, a slave device APn exposes a parameter called "AssignedNumber" as well as a parameter "UUID" allowing the smartphone to retrieve the value of the latter by virtue of the ATT ("Attribute Protocol") Bluetooth protocol.

The type of the parameter related to the duration of use UPTn (n=1, 2, 3) could be written in a new GATT characteristic of the type "org.bluetooth.characteristic.uptime" identified in a unique manner for example the number 0x2AFF and forming for example part of the service "org.bluetooth.service.uptime" identified in a unique manner by the number 0x18FF.

Example of response message of an enclosure during the GATT phase:

```
HTTP/1.1 200 OK
CONTENT-LENGTH: bytes in body
CONTENT-TYPE: text/xml; charset="utf-8"
DATE: when response was generated
EXT:
SERVER: OS/version UPnP/1.0 product/version
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:RequestBLEProfileResponse xmlns:u="urn:schemas-upnp-
org:service:blediscovery:1">
<Profile
xsi:noNamespaceSchemaLocation="http://schemas.bluetooth.org/Documents/profi
le.xsd"xmlns:xsi="http://www.w3.org/2001/XMLSchema-instance"
type="org.bluetooth.profile.uptime" name="Uptime">
<InformativeText>
<Abstract> abstract </Abstract>
<Summary> summary </Summary>
</InformativeText>
<Role name="Uptime for Speaker xxx">
<Service type="org.bluetooth.service.uptime"/>
<Characteristic>
<Type>"org.bluetooth.characteristic.uptime"</Type>
<Uuid>18ff</Uuid>
</Characteristic>
</Service>
```

```
</Profile>
</u:RequestBLEProfileResponse>
</s:Body>
</s:Envelope>
```

In our example, the smartphone receives three messages of this type during respective phases GATT1-GATT3, and retrieves for each message the value, designated by the parameter "uptime", of the temporal data which corresponds to the reference UPT namely for example 16 min, 0.3 min, 301 min.

Note that the temporal datum corresponds to a duration having a start instant and an end instant; the choice of the instants can vary according to the case of usage. In our example, the start instant corresponds to the instant of selection (hence reinitialization) and the end instant corresponds approximately to the instant of sending of the message by the enclosure. Other start and end instants can very obviously be chosen; the instants chosen are, preferably, the same for each enclosure. In this configuration, 0.3 min signifies that a duration of 0.3 minutes has elapsed between reinitialization and the sending of the message destined for the smartphone.

Hence, in our example, by complying with the previous start and end instants, the duration "16 min" signifies that the first enclosure AP1 has been used 16 minutes from its last reinitialization (by the button being pressed or it being powered up); and the duration "301 min" signifies that the third enclosure AP3 has been used 301 minutes from its last reinitialization (by the button being pressed or it being powered up);

Following reinitialization, the value of the temporal datum UPT2 may a zero value (UPT2=0 min). According to a variant, after reinitialization, the value of the temporal datum may be held at zero (UPT2=0) for a given temporal range for example for 10s counting from reinitialization. This allows the smartphone to avoid the use of a temporal range such as described hereinabove; a zero value being sufficient to make this value distinctive with respect to the other values received. The smartphone detects this distinctive value and chosen the enclosure concerned.

Once the temporal data UPT1-UPT3 have been retrieved, in our example, the smartphone determines by comparison the lowest value among the values received (MIN (UPTn), n=1, 2, 3).

MIN designates, in the present text, a mathematical operator able to select a minimum value (see several minimum values) from a given set of values.

In our example, MIN (16 min, 0.3 min, 301 min)=0.3 min; the lowest value is therefore that which corresponds to the second enclosure namely 0.3 min. In the case where the updated value is held at 0 min, the device identifies the temporal datum whose value is zero.

The choice of the enclosure can also be made in another way. For example, the smartphone MOB considers a given temporal range such as for example [0 min, 0.3 min] and chosen the enclosure that returned a value includes in this range.

Once determined, the smartphone connects CNX to the second enclosure AP2 automatically and may or may not use it to render a sound.

Additionally to the variants already described hereinabove, the embodiment described hereinabove can form the subject of other variants.

According to a first variant, selection of the enclosure may be done other than by pressing a button; electrical power-up of the enclosure can trigger a reinitialization of the counter.

According to a second variant, a user may wish to render a sound on several slave devices. In this configuration, the method can be performed in several ways, including the following.

According to a first way, the method described hereinabove can be executed a number of times equal to the number of slave devices to be selected.

According to a second way, during the first step, several slave devices are selected. It is for example considered that the first and the second enclosure have been selected by pressing the button described hereinabove. The selection data are updated on these devices. In the exemplary embodiment in which the parameter is a temporal duration UPT, the respective durations are reinitialized. The smartphone then receives several response messages, two of which include updated durations UPT1 and UPT3. Following reception, the smartphone MOB retrieves the value of the temporal data of the slave devices; these values are for example: (0.4 min, 0.3 min, 301 min), respectively; selection of the first and of the second device having been carried out at different instants, in this instance the second slave device has been selected after the first slave device. As has been seen previously, the durations 0.4 min and 0.3 min correspond to examples of durations elapsed between the instant of selection of the slave devices and the instant of sending of the respective messages by the smartphone MOB.

In the case where the value of the temporal data is held at zero during a temporal range, as described hereinabove, the smartphone connects to the slave devices having a zero value. There is no reason here to use a temporal range.

Once the counters have been retrieved, the smartphone MOB determines by comparison the value of the lowest temporal data from among the temporal data values received;

to this end, the smartphone considers a given temporal range such as for example [0 min, 2 min] and chosen all or some of the slave devices that have returned a value included in this range;

or, the number of slave devices to be considered can be advised at the level of the smartphone; for example, a user selects the number of slave devices to be used, two in our example, in this configuration, the smartphone chosen the slave devices having the two smallest durations.

Once determined, during a last step CNX, the smartphone connects to the first and to the second enclosure and uses them to render a sound.

We specify here that the term module can correspond either to a software component or to a hardware component or a set of hardware and software components, a software component itself corresponding to one or more computer programs or subprograms or more generally to any element of a program able to implement a function or a set of functions such as described for the modules concerned. In the same way, a hardware component corresponds to any element of a hardware set (or hardware) able to implement a function or a set of functions for the module concerned (integrated circuit, chip card, memory card, etc.).

The invention claimed is:

1. A method for connecting a master device with a slave device chosen from among several slave devices, the method comprising the following acts performed by the master device:
   receiving advertising messages arising from the several slave devices, the messages including respective temporal data provided by respective temporal counters able to reckon respective durations of use of the slave devices;
   comparing the temporal data received; and
   connecting with at least one of the several slave devices as a function of a result of the comparing.

2. The method as claimed in claim 1, in which if the connecting relates to a single slave device, the connecting is performed with the slave device whose received temporal datum is the smallest.

3. The method as claimed in claim 1, in which if the connecting relates to several slave devices, the connecting is performed with the slave devices whose temporal data are included in a given temporal range.

4. The method as claimed in claim 1, in which if the connecting relates to several slave devices, and if a number of connections is previously defined, the connecting is performed with a number of slave devices equal to the defined number and having the smallest temporal data.

5. The method as claimed in claim 1, comprising a reinitialization that brings about a setting to zero of the temporal datum of a respective one of the slave devices, and in which the value of the temporal datum resulting from the reinitialization is held at the same value for a predefined duration.

6. A method for connecting a slave device, which is able to communicate with another, master device, the method comprising the following acts performed by the slave device:
   selecting the slave device including modifying a temporal datum provided by a temporal counter able to reckon duration of use of the slave device;
   transmitting the updated temporal datum to the master device; followed by:
   connecting with the master device.

7. The method as claimed in claim 6, in which modifying corresponds to reinitializing the temporal datum.

8. A master device able to communicate with another, slave device, chosen from among several slave devices, the master device comprising:
   a processor; and
   a non-transitory computer-readable medium comprising instructions stored thereon, which when executed by the processor configure the master device to:
   receive advertising messages arising from the several slave devices, the messages including respective temporal data provided by respective temporal counters able to reckon respective durations of use of the slave devices;
   compare the temporal data received; and
   connect the master device to at least one slave device as a function of a result of the comparing.

9. A slave device able to communicate with another, master device, said slave device comprising:
   a processor; and
   a non-transitory computer-readable medium comprising instructions stored thereon, which when executed by the processor configure the slave device to:
   select the slave device including modifying a temporal datum provided by a temporal counter able to reckon duration of use of the slave device,
   transmit the updated temporal datum to the master device; and
   connect the slave device with the master device following transmission.

* * * * *